US011148203B2

(12) United States Patent
Kremer et al.

(10) Patent No.: US 11,148,203 B2
(45) Date of Patent: Oct. 19, 2021

(54) PLANT FOR ADDITIVELY MANUFACTURING AT LEAST ONE THREE-DIMENSIONAL OBJECT

(71) Applicant: CONCEPT LASER GMBH, Lichtenfels (DE)

(72) Inventors: Viktor Kremer, Lichtenfels (DE); Christoph Schmidbauer, Neustadt bei Coburg (DE); Ralf Hetzel, Bad Staffelstein (DE); Pascal Krause, Burgkunstadt (DE); Benjamin Krausser, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 132 days.

(21) Appl. No.: 16/293,552

(22) Filed: Mar. 5, 2019

(65) Prior Publication Data

US 2020/0147685 A1 May 14, 2020

(30) Foreign Application Priority Data

Nov. 10, 2018 (EP) ..................................... 18205551

(51) Int. Cl.
*B22F 10/10* (2021.01)
*B33Y 30/00* (2015.01)
(Continued)

(52) U.S. Cl.
CPC .............. *B22F 10/10* (2021.01); *B33Y 30/00* (2014.12); *B33Y 40/00* (2014.12); *B33Y 50/02* (2014.12);
(Continued)

(58) Field of Classification Search
CPC .......... B22F 3/008; B22F 10/10; B22F 12/80; B22F 12/82; B22F 12/84; B22F 12/86;
(Continued)

(56) References Cited

U.S. PATENT DOCUMENTS

| 2017/0050379 A1* | 2/2017 | Houben ................. B33Y 10/00 |
| 2018/0001567 A1* | 1/2018 | Juan ...................... B22F 3/1055 |
| 2018/0056393 A1* | 3/2018 | Herzog ................. B33Y 30/00 |

OTHER PUBLICATIONS

European Search Report Corresponding to EP18205551.7 dated Jun. 3, 2019.

* cited by examiner

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Plant for additively manufacturing at least one three-dimensional object, comprising at least one process station being configured to perform an additive manufacturing process and/or at least one preprocessing process for an additive manufacturing process and/or at least one postprocessing process for an additive manufacturing process; at least one conveying device configured to convey an item between at least two positions (P1, P2) of the plant, the conveying device comprising at least one conveying element, the at least one conveying element being at least partially bound to ground, and at least one conveying carriage being connectable or connected with the conveying element so as to be moveable between at least two positions (P1, P2) of the plant, the at least one conveying carriage comprising at least one supporting interface for supporting at least one item.

15 Claims, 4 Drawing Sheets

(51) Int. Cl.
  B33Y 40/00  (2020.01)
  B33Y 50/02  (2015.01)
  *B22F 12/88*  (2021.01)
  *B29C 64/386*  (2017.01)
  *B29C 64/20*  (2017.01)
  *B29C 64/30*  (2017.01)
  *B22F 12/86*  (2021.01)
  *B22F 12/82*  (2021.01)
  *B29C 64/379*  (2017.01)
  *B22F 12/84*  (2021.01)
  *B29C 64/00*  (2017.01)
  *B33Y 10/00*  (2015.01)
  *B29C 64/393*  (2017.01)
  *B33Y 40/10*  (2020.01)
  *B33Y 40/20*  (2020.01)
  *B22F 12/80*  (2021.01)
  *B29C 64/307*  (2017.01)

(52) U.S. Cl.
  CPC ............... *B22F 12/80* (2021.01); *B22F 12/82* (2021.01); *B22F 12/84* (2021.01); *B22F 12/86* (2021.01); *B22F 12/88* (2021.01); *B29C 64/00* (2017.08); *B29C 64/20* (2017.08); *B29C 64/30* (2017.08); *B29C 64/307* (2017.08); *B29C 64/379* (2017.08); *B29C 64/386* (2017.08); *B29C 64/393* (2017.08); *B33Y 10/00* (2014.12); *B33Y 40/10* (2020.01); *B33Y 40/20* (2020.01)

(58) Field of Classification Search
  CPC ......... B22F 12/88; B33Y 30/00; B33Y 40/00; B33Y 40/10; B33Y 40/20; B33Y 50/02; B29C 64/00; B29C 64/20; B29C 64/30; B29C 64/307; B29C 64/379; B29C 64/386; B29C 64/393
  USPC .......................................... 700/117; 425/375
  See application file for complete search history.

PLANT FOR ADDITIVELY MANUFACTURING AT LEAST ONE THREE-DIMENSIONAL OBJECT

CROSS-REFERENCE TO RELATED APPLICATIONS

This application claims priority to European Patent Application Ser. No. 18 205 551.7 filed Nov. 10, 2018, the contents of which is incorporated herein by reference in its entirety as if set forth verbatim.

FIELD OF THE INVENTION

The invention relates to a plant for additively manufacturing at least one three-dimensional object, comprising at least one process station being configured to perform an additive manufacturing process and/or at least one preprocessing process for an additive manufacturing process and/or at least one postprocessing process for an additive manufacturing process, and at least one conveying device configured to convey an item between at least two positions of the plant.

BACKGROUND

Plants for additively manufacturing three-dimensional objects are generally known from prior art. Respective plants typically comprise a number of process stations being configured to perform an additive manufacturing process and/or at least one preprocessing process for an additive manufacturing process and/or at least one postprocessing process for an additive manufacturing process, and a conveying device configured to convey an item, such as a powder module, between at least two positions of the plant.

Even though known plants for additively manufacturing three-dimensional objects provide reliable solutions for additively manufacturing three-dimensional objects, a further development of respective plants is required. Further developments shall specifically aim at more efficient approaches for installation and operation of respective plants.

It is the object of the present invention to provide an improved plant for additively manufacturing at least one three-dimensional object, particularly allowing for a more efficient approach for installation and operation.

SUMMARY OF THE INVENTION

This object is achieved by the subject-matter of the independent Claims. The Claims depending on the independent Claims relate to possible embodiments of the subject-matters of the independent Claims.

A first aspect of the present invention refers to a plant ("plant") for additively manufacturing at least one three-dimensional object. The plant is typically configured for mass or series production of additively manufactured three-dimensional objects, e.g. technical components.

The plant comprises at least one process station being configured to perform an additive manufacturing process and/or at least one preprocessing process for an additive manufacturing process and/or at least one postprocessing process for an additive manufacturing process. Hence, a respective process station may be configured to perform at least one process-step for the actual additive build-up of at least one three-dimensional object, and/or may be configured to perform at least one process-step for preparing an additive manufacturing process, e.g. by preparing build material for a forthcoming additive manufacturing process, by preparing a powder module, such as a build module, i.e. a module in which the actual additive build-up of a three-dimensional object takes place, for a forthcoming additive manufacturing process, by preparing a process chamber of an additive manufacturing apparatus for a forthcoming additive manufacturing process, etc., and/or may be configured to perform at least one process-step for completing an additive manufacturing process, e.g. by unpacking an additively manufactured three-dimensional object from surrounding non-consolidated build material, by thermally treating an (unpacked) additively manufactured three-dimensional object, by treating the surface of an (unpacked) additively manufactured three-dimensional object, by sieving build material which was not consolidated during a previous additive manufacturing process, etc.

Generally, each process station is provided with suitable functionality for performing its intended functionality, i.e. an additive manufacturing process and/or a preprocessing process and/or a postprocessing process. Thus, each process station comprises a number of functional and/or structural devices which are operable during its operation. Each functional and/or structural device may comprise a number of functional and/or structural units which may comprise a number of functional and/or structural sub-units.

An exemplary embodiment of a process station being configured to perform an additive manufacturing process is an apparatus ("apparatus") for additively manufacturing at least one three-dimensional object by means of successive layerwise selective irradiation and consolidation/solidification of build material layers which can be consolidated/solidified by means of being irradiated with at least one energy beam, i.e. layers of a build material which can be consolidated by means of being irradiated with at least one energy beam. The build material may be provided as a powder, for instance. The build material may be or comprise a ceramic, a polymer, or a metal, for instance. The energy beam may be an electron beam or a laser beam, for instance. The apparatus may be implemented as a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

A respective apparatus typically comprises a build plane. The build plane can be defined as a plane in which the successive layerwise selective irradiation and consolidation of layers of build material which can be consolidated by means of an energy beam can take place during operation of the apparatus. The build plane is typically disposed in a process chamber of the apparatus. The build plane typically extends in or parallel to a bottom wall of the process chamber of the apparatus.

A respective apparatus comprises a number of functional and/or structural devices which are operable during its operation. Each functional and/or structural device may comprise a number of functional and/or structural units which may comprise a number of functional and/or structural sub-units.

A first exemplary functional device of the apparatus is a build material application device configured to apply an amount, particularly a specific amount, of build material in the build plane of the apparatus so as to form a build material layer which is to be selectively irradiated and consolidated by means of the at least one energy beam. A respective build material application device typically comprises at least one build material application element, e.g. a recoating element, configured to apply an amount, particularly a specific amount of build material in the build plane of the apparatus so as to form a build material layer which is to be selectively irradiated and consolidated by means of the at least one energy beam. A respective build material application element may be moveably supported relative to the build plane. A second exemplary functional device is an irradiation device configured to successively selectively irradiate and consolidate respective layers of build material applied in the build plane of the apparatus with at least one energy beam, e.g. an electron beam or a laser beam. A respective irradiation device typically comprises at least one irradiation element, e.g. an energy beam generation element and/or an energy beam deflection element, configured to move an energy beam across the build plane of the apparatus so as to electively irradiate and consolidate respective layers of build material applied in the build plane of the apparatus.

A first exemplary structural device of the apparatus is a support frame structure configured to support at least one functional device and/or at least one further structural device of the apparatus. A respective support frame structure typically comprises at least one support frame element, e.g. bar, rod, etc., configured to support at least one functional device and/or at least one further structural device. Additional functional and/or structural devices are conceivable. A second exemplary structural device is the process chamber of the apparatus. The process chamber typically comprises at least one process chamber wall element delimiting an inner process volume of the process chamber.

An exemplary embodiment of a preprocessing station is a powder module preparation station in which powder modules which are to be used in a forthcoming additive manufacturing process are prepared, e.g. by being filled with build material, cleaned, inertized, etc. A respective powder module preparation station may be built as, comprise or be combined with a sieving station in which fresh build material is sieved and/or mixed with used build material so as to provide a build material composition of desired properties, such as particle size, particle morphology, etc. for a forthcoming additive manufacturing process.

An exemplary functional device of a respective preprocessing station is a sieving device configured to sieve build material. Other functional devices are conceivable.

An exemplary structural device of a respective preprocessing station is a support frame structure configured to support at least one functional device and/or at least one further structural device of the preprocessing station. A respective support frame structure typically comprises at least one support frame element, e.g. bar, rod, etc., configured to support at least one functional device and/or at least one further structural device. Other structural devices are conceivable.

An exemplary embodiment of a postprocessing station is an unpacking station in which an additively manufactured three-dimensional object is unpacked from surrounding non-consolidated build material. A respective unpacking station may comprise or be combined with a sieving station in which non-consolidated build material is sieved and/or mixed with fresh build material so as to provide a build material composition of desired properties, such as particle size, particle morphology, etc., for a forthcoming additive manufacturing process. Another exemplary postprocessing station is a thermal treatment station in which an additively manufactured three-dimensional object undergoes a thermal treatment, i.e. particularly a heat treatment, so as to adjust the structural properties of the additively manufactured three-dimensional object, e.g. by relieving internal stresses. Another exemplary postprocessing stations is a surface treatment station in which an additively manufactured three-dimensional object undergoes a surface treatment, i.e. particularly a chemical and/or physical surface treatment, e.g. by etching and/or machining, so as to adjust the surface properties of the additively manufactured three-dimensional object. Another exemplary postprocessing station is a densification station in which an additively manufactured three-dimensional object undergoes a densification treatment so as to adjust the structural properties of the additively manufactured three-dimensional object, particularly the density of the additively manufactured three-dimensional object. Another exemplary postprocessing station is an infiltration station in which an additively manufactured three-dimensional object undergoes an infiltration treatment so as to adjust the structural properties of the additively manufactured three-dimensional object, particularly the strength of the additively manufactured three-dimensional object.

An exemplary functional device of a respective postprocessing station is a build material removal device, e.g. a sucking and/or blowing device, configured to remove non-consolidated build material from an additively manufactured three-dimensional object. Other functional devices are conceivable.

An exemplary structural device of a respective postprocessing station is a support frame structure configured to support at least one functional device and/or at least one further structural device of the postprocessing station. A respective support frame structure typically comprises at least one support frame element, e.g. bar, rod, etc., configured to support at least one functional device and/or at least one further structural device. Other structural devices are conceivable.

Other exemplary embodiments of pre- and/or postprocessing stations than the ones mentioned before are conceivable.

The plant typically comprises a plurality of process stations, i.e. at least two process stations. The process stations typically are distributed in an additive manufacturing environment defined by the plant. The additive manufacturing environment may comprise one or more buildings, e.g. a fabric hall, or one or more parts of a building, e.g. rooms. The process stations may be arbitrarily arranged relative to each other in a respective additive manufacturing environment. Exemplary arrangements of respective process stations comprise respective process stations arranged in a line or row, respectively. In either case, the process stations do not physically contact each other, i.e. are particularly not (directly) mechanically coupled, such that there is typically a small (air-)gap between adjacently disposed process stations.

In addition to the at least one process station, the plant comprises at least one conveying device configured to convey an item between at least two positions of the plant, i.e. particularly along a conveying path extending between at least two positions of the plant. A respective conveying path typically connects the at least two positions in a respective additive manufacturing environment.

The at least two positions may be assigned to at least two different process stations. Hence, a conveying path may at least extend between two different process stations, the respective two different process stations may be adjacent process stations or non-adjacent process stations. The conveying device may thus, be configured to convey items between different process stations.

The at least two positions may be located in the same or different buildings, rooms, etc. Hence, a conveying path may extend in one or more different buildings, rooms, etc. The conveying device may be thus, configured to convey items between two different positions which may be located in the same or different buildings, rooms, etc. of an additive manufacturing environment.

An item can be any functional and/or structural element which needs to be conveyed from a first position to a second position, or vice versa, during operation of the plant. An exemplary embodiment of an item can be a powder module, such as a build module, a dose module, or an overflow module, for instance. Another exemplary embodiment of an item can be a build plate, particularly a build plate which is insertable in a receiving volume of a build module, the build plate being configured to support build material and/or an additively manufactured three-dimensional object. Another exemplary embodiment of an item can be an additively manufactured object. Another exemplary embodiment of an item can be a detecting device configured to determine at least one chemical and/or physical parameter of at least one additive manufacturing process and/or at least one preprocessing process for an additive manufacturing process and/or at least one postprocessing process for an additive manufacturing process. Another exemplary embodiment of an item can be a service and/or repair device configured to perform at least one service and/or repair functionality for at least one functional component of the at least one process station. Another exemplary embodiment of an item can be a cleaning device configured to clean at least one conveying element and/or at least one functional component of the at least one process station. Other exemplary embodiments of items are conceivable.

According to the present invention, the conveying device comprises at least one conveying element defining the at least one conveying path. The at least one conveying element is at least partially bound to ground, i.e. connected with ground, particularly attached to ground, allowing for easy and stable installation. The at least one conveying element is typically a longitudinal component or a longitudinal component group extending in the additive manufacturing environment. Each portion of the at least one conveying element can represent a respective first or second position in between which a respective item can be conveyed by the conveying device.

The conveying device may comprise a plurality of conveying elements and conveying paths, respectively which may be interconnectable or interconnected with each other so as to form a network of conveying elements and conveying paths, respectively arranged in one or more spatial directions or orientations, respectively. Hence, each conveying element may be provided with a connection interface, i.e. particularly a mechanical connection interface, allowing for interconnecting the respective conveying element with at least one further conveying element.

According to the present invention, the conveying device further comprises at least one conveying carriage, e.g. a conveying slide, conveying skid, conveying vehicle or conveying wagon, for instance, being connectable or connected with the at least one conveying element so as to be moveable along the at least one conveying path. The at least one conveying carriage comprises at least one supporting interface for supporting at least one item. As will be more apparent from below, a respective supporting interface can be any interface allowing for a temporary attachment or connection of the at least one item with the conveying carriage, i.e. particularly a base body of the at least one conveying carriage.

The at least one conveying element and the at least one conveying carriage may interact with each other so as to form a "conveying couple" allowing for conveying at least one item between a respective first and a respective second position. Thereby, the at least one item is (temporarily) supported by the at least one conveying carriage and the at least one conveying carriage (temporarily) supporting the at least one item is moveable along the conveying path, i.e. particularly moveably supported by the at least one conveying element.

The interaction of the at least one conveying element with the at least one conveying carriage allows for an easy and exact conveyance of items with the plant.

The conveying device is typically a separate device to the at least one process station which is not physically connectable or connected, i.e. particularly not mechanically couplable or coupled, with the at least one process station. Hence, the conveying device is typically to be deemed as a separate device of the plant whose operation is generally, independent from the operation of any process station of the plant. Providing the conveying device as a respective separate device is of advantage for installation, modification and operation of the conveying device. Hence, the conveying device may be generally, installed, modified or operated independent from any of process station of the plant.

This also applies for the case in which a respective conveying element extends through at least one process station. In this case, a respective process station is provided with a, particularly passage- or tunnel-like, opening allowing for that at least one conveying element may at least partially extend in or through a respective process station without actually physically contacting the process station. Hence, the dimensions of the opening in a respective process station are dimensioned in such a manner that at least one conveying element may least partially extend in or through the respective process station without physically contacting the process station.

A respective conveying element may be provided in any dimensions, i.e. particularly, length, shape, etc. As such, a respective conveying element may comprise at least one conveying element portion which extends straight and/or which comprise at least one conveying element portion which extends curved.

The plant may comprise at least one switch device assigned to the conveying device. A respective switch device is configured to switch the orientation of the at least one conveying element from a first spatial orientation to at least one further spatial orientation. A respective switch device enhances the possibilities of item conveyance in the plant. A respective switch also enhances the possibilities of reaching any locations in the plant increasing the degree of individualization of respective conveying paths.

The or a respective switch device may be built as or comprise a turning table, for instance. A respective turning table is configured to change the spatial orientation of a respective conveying element, particularly with a respective conveying carriage supported thereon, by rotation around a, particularly vertically oriented, rotary motion axis. A respective turning table may thus, be rotated in different rotary positions, whereby the turning table typically connects to at least one conveying element in every rotary position.

The plant may further comprise at least one branching device assigned to the conveying device. A respective branching device is configured to branch the at least one conveying element in at least two conveying element branches, the at least two conveying element branches each representing a separate conveying element. A respective branching device also enhances the possibilities of item conveyance in the plant. A respective branching device also enhances the possibilities of increasing the degree of individualization of respective conveying paths.

The plant may further comprise at least one combining device. A respective combining device is configured to combine at least two separate conveying elements in a at least one conveying element, the at least one conveying element representing a separate conveying element. A respective combining device also enhances the possibilities of item conveyance in the plant. A respective combining device also enhances the possibilities of increasing the degree of individualization of respective conveying paths.

With regard to the actual conveyance of a respective conveying carriage along a respective conveying path, the following exemplary options, which may be arbitrarily combined with each other, are given:

A respective conveying element may be configured to generate a conveying force so as to move the at least one conveying carriage along the at least one conveying path. Hence, the conveying element may be moved itself along a respective conveying path. A respective conveying carriage does not have to be provided with an own drive unit in this exemplary embodiment. A respective conveying element may be embodied as a conveying band, a conveying belt, or a conveying chain, for instance.

Additionally or alternatively, a respective conveying carriage may be provided with a drive unit, particularly a drive motor, configured to generate a drive force so as to move the at least one conveying carriage along the at least one conveying path. Hence, the conveying carriage may be self-driven and thus, moves itself along a respective conveying path. A respective conveying element does not need to be provided with an own drive unit in this exemplary embodiment. A respective conveying element may be embodied as a conveying rail, a conveying rack, or any other non-driven conveying track, for instance.

Additionally or alternatively, a moveable traction carriage being provided with a drive unit, particularly a drive motor, configured to generate a drive force so as to move the traction carriage along the at least one conveying path may be provided. A respective traction carriage is self-driven and thus, moves itself along a respective conveying path. Neither a respective conveying element nor a respective conveying carriage needs to be provided with an own drive unit in this exemplary embodiment. A respective traction carriage may be connectable or connected with a respective conveying carriage so as to move a respective conveying carriage along the at least one conveying path. A respective traction carriage may thus, comprise at least one coupling interface configured to establish a (temporary) coupling of the traction carriage with at least one conveying carriage and/or with at least one further traction carriage. In other words, train-like assemblies, particularly goods train-like assemblies, of traction carriages and conveying carriages can be realized which can be individually configured, particularly with regard to the number and order of respective traction carriages and/or conveying carriages.

As is apparent from above, the conveying device may comprise at least two conveying carriages. Thereby, each conveying carriage may comprise a coupling interface configured to establish a coupling with at least one further conveying carriage, particularly so as to form a conveying carriage assembly, and/or with at least one traction carriage. Respective coupling interfaces of conveying carriages and traction carriages may be standardized which allows for an easy, quick and safe coupling and decoupling of conveying carriages and/or traction carriages. Respective coupling interfaces may be built as mechanical coupling interfaces, such as buffer-and-chain-couplings or link- and pin-couplings, for instance. Yet, magnetic coupling interfaces or any other coupling interfaces are conceivable as well.

A respective conveying carriage may comprise at least one supporting interface configured to support at least one item which is to be conveyed by the conveying carriage along the at least one conveying path. A respective supporting interface allows for a temporary support of a respective item which is to be conveyed by the conveying carriage along the at least one conveying path. A respective support interface may be built as or provided with a support compartment of a base body of a conveying carriage. Hence, a respective conveying carriage may comprise a base body having at least one support compartment configured to support at least one item which is to be conveyed by the conveying carriage along the at least one conveying path. A respective support compartment may form part of a support frame of the conveying carriage or the base body, respectively. The dimensions of a respective support compartment may be adapted to the dimensions of an item which is to be conveyed by the conveying carriage along the at least one conveying path. Hence, a respective support compartment may be embodied as a receptacle configured to at least partially, particularly completely, receive a respective item, for instance. A respective receptacle is typically defined by wall elements of a respective support compartment which may at least partially cover or engage at least one surface of an item which is to be supported by the support compartment.

A respective conveying carriage may comprise at least two supporting interfaces configured to support at least one item which is to be conveyed by the conveying carriage along the at least one conveying path. Respective supporting interfaces may have the same or a different configuration, whereby in the first case the supporting interfaces are configured to support items of same or similar dimensions and/or items of same or similar functionality and in the latter case the supporting interfaces are configured to support items of different dimensions and/or items of different functionality. Hence, respective conveying carriages may be individually provided with a specific arrangement of supporting interfaces so that respective conveying carriages may be specified for conveying a specific arrangement and number of items. Yet, it is also possible that conveying carriages are standardized, i.e. provided with a standardized arrangement of supporting interfaces.

At least one transfer device may be assigned to the at least one conveying carriage, particularly to the at least one supporting interface of a respective conveying carriage. A respective transfer device may be configured to transfer a supported item between a first position and/or orientation and at least one second position and/or orientation relative to a base body of the conveying carriage. A respective first position and/or orientation may be a conveying position and/or orientation in which a respective item supported by the conveying carriage is positioned and/or oriented when the conveying carriage (together with the supported item) is conveyed along a respective conveying path and the second position and/or orientation may be a transfer position and/or orientation in which a respective item supported by the conveying carriage is positioned and/or oriented when the item is to be or is transferred from the conveying carriage to a process station. A respective transfer device is thus, particularly configured to move a supported item between a respective conveying position and/or orientation and a respective transfer position and/or orientation. A respective item is typically received in a respective receptacle of the conveying carriage in the conveying position and/or orientation and has typically left a respective receptacle in the transfer position and/or orientation.

A respective transfer device may be built as or comprise a pushing and/or pulling device configured to push or pull a supported item in a lateral direction between a first position and/or orientation and a second position and/or orientation relative to a base body of the conveying carriage. Hence, a transfer device may be particularly, configured to change the lateral position and/or orientation of a supported item.

A respective transfer device may also be built as or comprise a lifting device configured to lift a supported item in a vertical direction between a first position and/or orientation and a second position and/or orientation relative to a base body of the conveying carriage. Hence, a transfer device may be particularly, configured to change the vertical position and/or orientation of a supported item.

At least one locking device may be assigned to the at least one conveying carriage, particularly to a respective supporting interface of the conveying carriage. A respective locking device may be configured to lock an item supported by the at least one supporting interface in a defined position and/or orientation, particularly in a respective conveying position, relative to a base body of the conveying carriage. Hence, a respective locking device allows for safe and stable conveying respective items by respective conveying carriages.

A respective locking device may comprise at least one locking element configured to interact, particularly configured to magnetically, mechanically, pneumatically, etc. interact, with an item supported by the at least one supporting interface of a conveying carriage. In either case, a respective locking element may generate a locking force stably locking an item supported by the at least one supporting interface of a conveying carriage in place.

A respective conveying carriage may comprise a determination device, particularly assigned to the at least one supporting interface. A respective determination device may be configured to determine at least one chemical and/or physical parameter of an item supported by the at least one supporting interface and/or configured to determine at least one chemical and/or physical parameter of a substance, e.g. build material, and/or an object, e.g. an additively manufactured three-dimensional object, contained within the item supported by the at least one supporting interface. A respective determination device may be further configured to generate an information indicating the determined at least one chemical and/or physical parameter. A respective determination device may comprise at least one detection element, e.g. a sensor element, configured to determine at least one chemical and/or physical parameter of an item supported by the at least one supporting interface and/or configured to determine at least one chemical and/or physical parameter of a substance and/or an object contained within the item supported by the at least one supporting interface. A respective detection element may be built as or comprise a temperature sensor, gas sensor, pressure sensor, force sensor, gravity sensor, etc.

A respective conveying carriage may comprise at least one (further) determination device configured to determine at least one actual and/or future operating parameter of the conveying carriage, particularly a conveying parameter of the conveying carriage referring to a conveying motion of the conveying carriage between at least two positions, and to generate an operating information indicating the determined at least one operating parameter. A respective operating parameter may refer to any actual and/or future status of an operating parameter of the conveying carriage and/or a sub-unit of the conveying carriage, e.g. a drive device, item transfer device, respectively. A respective conveying parameter may refer to (positive or negative) acceleration, speed, conveying direction, conveying duration, etc. of the conveying carriage.

A respective determination device may additionally or alternatively be configured to determine at least one actual and/or future position parameter of the at least one conveying carriage and to generate a position information indicating the determined position parameter. A respective position parameter may refer to a local or global position of a respective conveying carriage. A respective position parameter may thus, refer to local or global position data, e.g. GPS-data, of a respective conveying carriage.

The plant may be provided with a hardware- and/or software embodied control unit being configured to control at least one conveying parameter, e.g. (positive or negative) acceleration, speed, starting point, destination point, etc., of the at least one conveying carriage, particularly on basis of a determined operating information, particularly conveying information, and/or position information. A respective control unit may comprise at least one control sub-unit provided with a conveying carriage. Hence, any conveying motion of a respective conveying carriage within the plant can be performed on basis of control data, particularly derived from determined operating information and/or position information, which allows for an automated and highly efficient operation, particularly motion, of respective conveying carriages within the plant. Considering information such as conveying information and/or position information, for instance may allow for determining highly efficient conveying paths, particularly with reduced conveying duration, of items between a respective first and second position. Merely as an example, conveying paths with a high number of conveying carriages can be avoided for a specific conveying carriage such that the specific conveying carriage may use a different conveying path for conveying an item between a respective first and second position.

A respective conveying carriage may comprise a data storage device, e.g. a volatile or non-volatile data memory, configured to store at least one information of the conveying carriage and/or at least one information of at least one item conveyed by the conveying carriage and/or at least one information of a substance and/or on object within an item conveyed by the conveying carriage and/or at least one information of the conveying path the conveying carriage is intended to be conveyed along.

A respective conveying carriage may comprise a communication device assigned to the data storage device. The communication device may be configured to transmit information from the data storage device to at least one communication partner, e.g. to a different conveying carriage, traction device, item, beacon or any other Bluetooth low energy (BLE) device, or superordinate control unit of the plant, and/or to receive information to be stored in the data storage device from at least one communication partner, e.g. from a different conveying carriage, traction device, item, beacon or any other Bluetooth low energy (BLE) device, or superordinate control unit of the plant. The communication device may comprise at least one communication element allowing for short- and/or long-range communication. Merely as an example, a respective communication element may be built as or comprise a radio frequency identification (RFID) device, particularly a RFID transceiver device, or a Bluetooth low energy (BLE) device.

As mentioned above, the plant typically defines an additive manufacturing environment. The additive manufacturing environment may comprise one or more buildings, e.g. a fabric hall, or one or more parts of a building, e.g. rooms. The plant may thus, comprise at least two buildings, whereby the conveying device may be configured to convey at least one item between a first position in a first building and a second position in a second building. At least one building of the plant may comprise at least two adjacent or non-adjacent rooms, whereby the conveying device may be configured to convey at least one item between a first position in a first room and a second position in a second room. Of course, the conveying device may also be configured to convey at least one item within one (single) room of a building.

In either case, a respective conveying element may be at least partially housed by a housing structure. The housing structure may represent a tunnel through which the respective conveying element extends. A respective housing structure increases the safety of the conveying device and the plant, respectively since personal cannot get in contact with the conveying device.

Another aspect of the present invention refers to a conveying device for a plant for additively manufacturing three-dimensional objects, the conveying device comprising configured to convey an item, particularly a powder module, between at least two positions of the plant. The conveying device comprises at least one conveying element being at least partially bound to ground, and at least one conveying carriage being moveably supported by the conveying element so as to be moved between the at least two positions of the plant, the at least one conveying carriage comprising at least one supporting interface for supporting an item. All annotations regarding the plant also apply to the conveying device.

Another aspect of the present invention refers to a method for conveying at least one item between at least two positions of a plant for additively manufacturing at least one three-dimensional object, whereby a conveying device as described herein is used for conveying the at least one item between the at least two positions of the plant. All annotations regarding the plant also apply to the method.

BRIEF DESCRIPTION OF THE DRAWINGS

Exemplary embodiments of the invention are described with reference to the FIG., whereby:

FIG. 1-5 each show a principle drawing of a plant 1 for additively manufacturing of at least one three-dimensional object 2 according to an exemplary embodiment.

DETAILED DESCRIPTION

The plant 1 is typically configured for mass or series production of additively manufactured three-dimensional objects, e.g. technical components.

Figure 1:
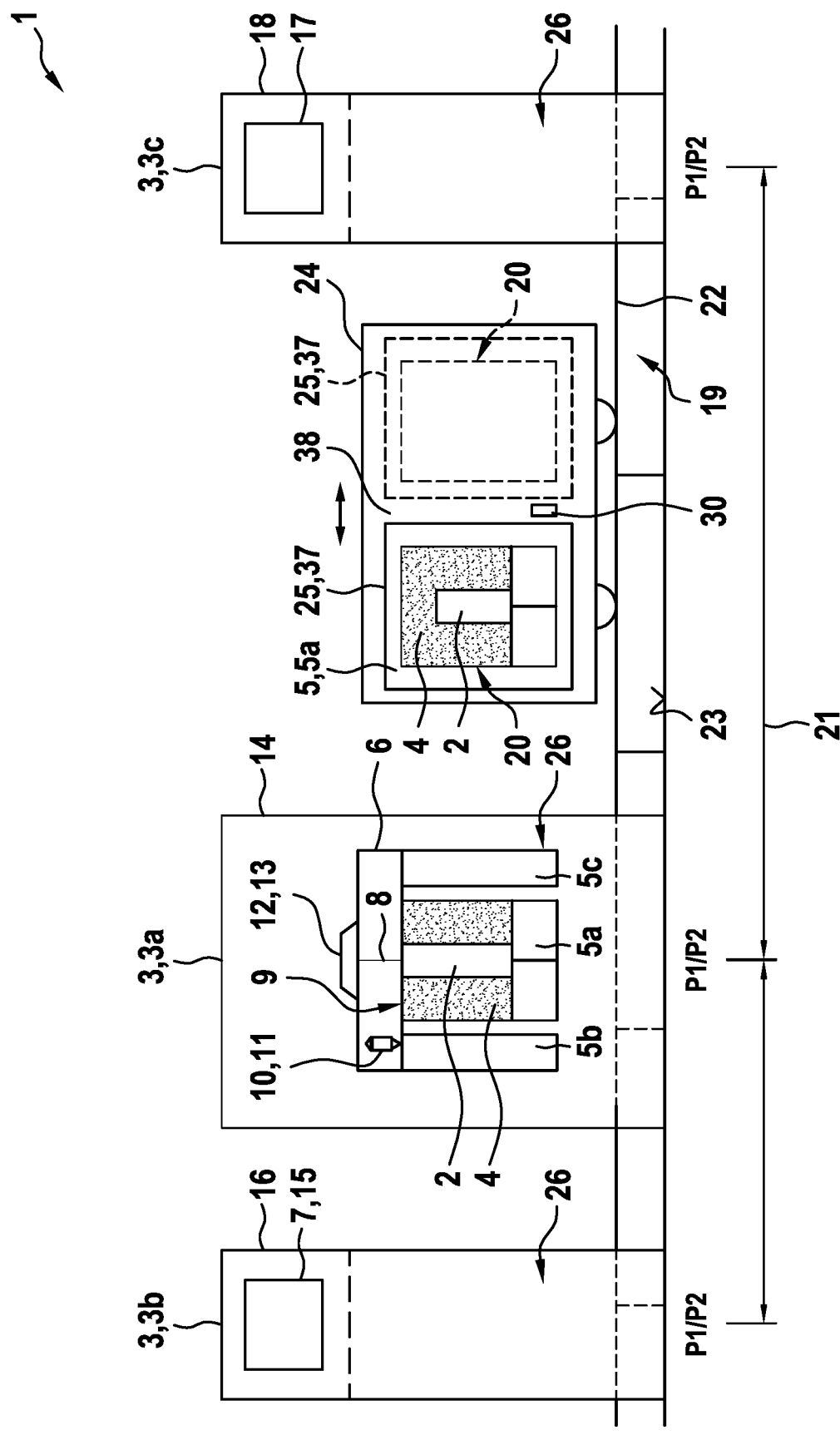
FIG. 1-5 each show a principle drawing of a plant for additively manufacturing of at least one three-dimensional object according to an exemplary embodiment.
Figure 2:
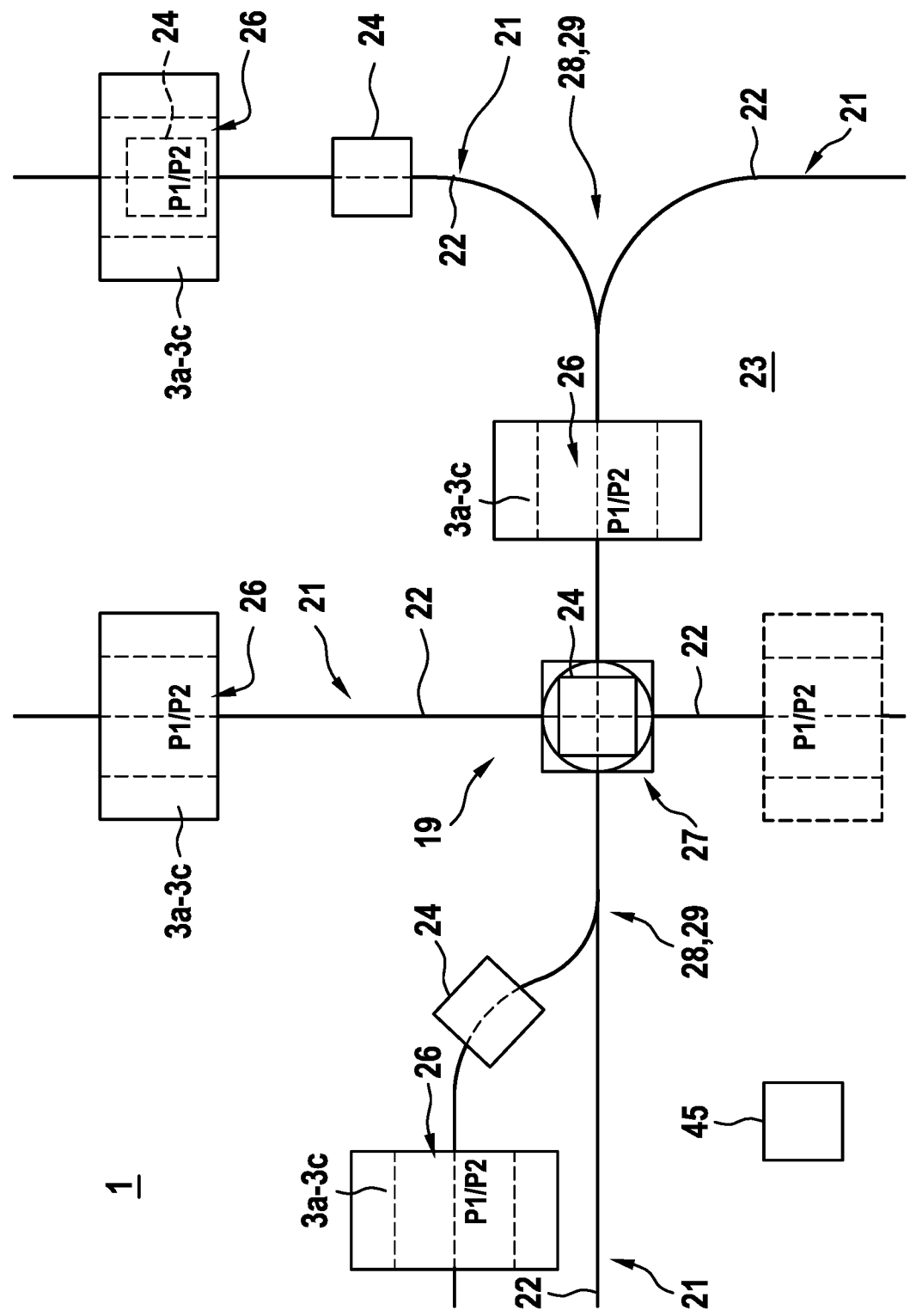

As is particularly apparent from FIGS. 1 and 2, the plant 1 comprises a number of process stations 3, 3a-3c, whereby process station 3a is configured to perform an additive manufacturing process, process station 3b is configured to perform at least one preprocessing process for an additive manufacturing process and process station 3c is configured to perform at least one postprocessing process for an additive manufacturing process. Hence, a respective process station 3a is configured to perform at least one process-step for the actual additive build-up of at least one three-dimensional object 2, a respective process station 3b is configured to perform at least one process-step for preparing an additive manufacturing process, e.g. by preparing build material 4 for a forthcoming additive manufacturing process, by preparing a powder module 5, such as a build module 5a, i.e. a module in which the actual additive build-up of a three-dimensional object 2 takes place, for a forthcoming additive manufacturing process, by preparing a process chamber 6 of an additive manufacturing apparatus for a forthcoming additive manufacturing process, etc., and a respective process station 3c is configured to perform at least one process-step for completing an additive manufacturing process, e.g. by unpacking an additively manufactured three-dimensional object 2 from surrounding non-consolidated build material 4, by thermally treating an (unpacked) additively manufactured three-dimensional object 2, by treating the surface of an (unpacked) additively manufactured three-dimensional object 2, by sieving build material 4 which was not consolidated during a previous additive manufacturing process by a sieving device 7, etc.

Generally, each process station 3a-3c is provided with suitable functionality for performing its intended functionality, i.e. an additive manufacturing process and/or a preprocessing process and/or a postprocessing process. Thus, each process station 3a-3c comprises a number of functional and/or structural devices which are operable during its operation. Each functional and/or structural device may comprise a number of functional and/or structural units which may comprise a number of functional and/or structural sub-units.

According to the exemplary embodiment of the FIG., a respective process station 3a configured to perform an additive manufacturing process is an apparatus ("apparatus") for additively manufacturing at least one three-dimensional object 2 by means of successive layerwise selective irradiation and consolidation of build material layers, e.g. layer of a metal powder, which can be consolidated by means of being irradiated with at least one energy beam 8, i.e. layers of a build material 4 which can be consolidated by means of being irradiated with at least one energy beam 8. The energy beam 8 may be an electron beam or a laser beam, for instance. The apparatus may be implemented as a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

As is apparent from FIG. 1, showing a side-view of an exemplary embodiment of a respective plant 1, a respective apparatus comprises a build plane 9. The build plane 9 can be defined as a plane in which the successive layerwise selective irradiation and consolidation of layers of build material 4 which can be consolidated by means of the energy beam 8 takes place during operation of the apparatus. The build plane 9 is disposed in the process chamber 6 of the apparatus. The build plane 9 extends in or parallel to a bottom wall of the process chamber 6 of the apparatus.

As indicated in the FIG., the apparatus comprises a number of functional and/or structural devices which are operable during its operation. Each functional and/or structural device may comprise a number of functional and/or structural units which may comprise a number of functional and/or structural sub-units.

A first exemplary functional device is a build material application device 10 configured to apply an amount of build material 4 in the build plane 9 of the apparatus so as to form a build material layer which is to be selectively irradiated and consolidated by means of the at least one energy beam 8. The build material application device 10 comprises a build material application element 11, e.g. a recoating element, configured to apply an amount of build material 4 in the build plane 9 of the apparatus so as to form a build material layer which is to be selectively irradiated and consolidated by means of the energy beam 8. As indicated by the double-arrow, the build material application element 11 is moveably supported relative to the build plane 9. A second exemplary functional device is an irradiation device 12 configured to successively selectively irradiate and consolidate respective layers of build material 4 applied in the build plane 9 of the apparatus 1 with at least one energy beam 8. The irradiation device 12 comprises at least one irradiation element 13, e.g. an energy beam generation element and/or an energy beam deflection element, configured to move an energy beam 8 across the build plane 9 of the apparatus so as to electively irradiate and consolidate respective layers of build material 4 applied in the build plane 9 of the apparatus.

A first exemplary structural device of the apparatus is a support frame structure 14 configured to support at least one functional device and/or at least one further structural device of the apparatus. A respective support frame structure 14 typically comprises at least one support frame element, e.g. bar, rod, etc., configured to support at least one functional device and/or at least one further structural device. Additional functional and/or structural devices are conceivable. A second exemplary structural device is the process chamber 6 of the apparatus. As is apparent from FIG. 1, the process chamber 6 comprises at least one process chamber wall element delimiting an inner process volume of the process chamber 6.

An exemplary embodiment of a preprocessing station 3*b* is a powder module preparation station in which powder modules 5, 5*a*-5*c* which are to be used in a forthcoming additive manufacturing process are prepared, e.g. by being filled with build material, cleaned, inertized, etc. A respective powder module preparation station may be built as, comprise or be combined with a sieving station in which fresh build material 4 is sieved and/or mixed with used build material 4 so as to provide a build material composition 4 of desired properties, such as particle size, particle morphology, etc. for a forthcoming additive manufacturing process.

An exemplary functional device of a respective preprocessing station 3*b* is a sieving device 15 configured to sieve build material 4. Other functional devices are conceivable.

An exemplary structural device of a respective preprocessing station 3*b* is a support frame structure 16 configured to support at least one functional device and/or at least one further structural device of the preprocessing station 3*b*. A respective support frame structure 16 typically comprises at least one support frame element, e.g. bar, rod, etc., configured to support at least one functional device and/or at least one further structural device. Other structural devices are conceivable.

An exemplary embodiment of a postprocessing station 3*c* is an unpacking station in which an additively manufactured three-dimensional object 2 is unpacked from surrounding non-consolidated build material 4. A respective unpacking station may also comprise or be combined with a sieving station in which non-consolidated build material 4 is sieved and/or mixed with fresh build material 4 so as to provide a build material composition of desired properties, such as particle size, particle morphology, etc., for a forthcoming additive manufacturing process. Another exemplary postprocessing station 3*c* is a thermal treatment station in which an additively manufactured three-dimensional object 2 undergoes a thermal treatment, i.e. particularly a heat treatment, so as to adjust the structural properties of the additively manufactured three-dimensional object 2, e.g. by relieving internal stresses. Another exemplary postprocessing station 3*c* is a surface treatment station in which an additively manufactured three-dimensional object 2 undergoes a surface treatment, i.e. particularly a chemical and/or physical surface treatment, e.g. by etching and/or machining, so as to adjust the surface properties of the additively manufactured three-dimensional object 2. Another exemplary postprocessing station 3*c* is a densification station in which an additively manufactured three-dimensional object 2 undergoes a densification treatment so as to adjust the structural properties of the additively manufactured three-dimensional object 2, particularly the density of the additively manufactured three-dimensional object 2. Another exemplary postprocessing station 3*c* is an infiltration station in which an additively manufactured three-dimensional object 2 undergoes an infiltration treatment so as to adjust the structural properties of the additively manufactured three-dimensional object 2, particularly the strength of the additively manufactured three-dimensional object 2.

An exemplary functional device of a respective postprocessing station 3*c* is a build material removal device 17, e.g. a sucking and/or blowing device, configured to remove non-consolidated build material 4 from an additively manufactured three-dimensional object 2. Other functional devices are conceivable.

An exemplary structural device of a respective postprocessing station 3*c* is a support frame structure 18 configured to support at least one functional device and/or at least one further structural device of the postprocessing station 3*c*. A respective support frame 18 structure typically comprises at least one support frame element, e.g. bar, rod, etc., configured to support at least one functional device and/or at least one further structural device. Other structural devices are conceivable.

As is apparent from the FIG., the plant 1 comprises a plurality of process stations, i.e. at least two process stations 3*a*-3*c* distributed in an additive manufacturing environment defined by the plant 1. As is indicated in FIG. 2, showing a top-view of an exemplary embodiment of plant 1, by dotted boxes, the additive manufacturing environment may comprise one or more buildings indicated by dotted boxes, e.g. a fabric hall, or one or more parts of a building also indicated by dotted boxes, e.g. rooms. The process stations 3*a*-3*c* may be arbitrarily arranged relative to each other in a respective additive manufacturing environment. An exemplary arrangement of respective process stations 3*a*-3*c* comprise respective process stations 3*a*-3*c* arranged in a line or row, respectively (see FIG. 1). In either case, the process stations 3*a*-3*c* do not physically contact each other, i.e. are particularly not (directly) mechanically coupled, such that there is typically a small (air-)gap between adjacently disposed process stations 3*a*-3*c*.

The plant 1 further comprises a conveying device 19 configured to convey an item 20 between at least two positions P1, P2 of the plant 1, particularly along a conveying path 21 extending between the at least two positions P1, P2 of the plant 1 (see double-arrow in FIG. 1). As indicated in FIG. 1, 2, a respective conveying path connects at least two positions P1, P2 in a respective additive manufacturing environment.

As is apparent from FIG. 1, the at least two positions P1, P2 of the plant 1 may be assigned to at least two different process stations 3a-3c, for instance. Hence, a conveying path 21 may at least extend between two different process stations 3a-3c, the respective two different process stations 3a-3c may be adjacent process stations or non-adjacent process stations. The conveying device 19 is thus, configured to convey items 20 between different process stations 3a-3c.

As is indicated in FIG. 2, the at least two positions P1, P2 may be located in the same or different buildings, rooms, etc. Hence, a conveying path 21 may extend in one or more different buildings, rooms, etc. The conveying device 19 is thus, configured to convey items 20 between two different positions which may be located in the same or different buildings, rooms, etc. of an additive manufacturing environment.

An item 20 can be any structural element which needs to be conveyed from a first position P1 to a second position P2, or vice versa, during operation of the plant 1. An exemplary embodiment of an item 20 is a powder module 5, such as a build module 5a, a dose module 5b, or an overflow module 5c, for instance. Another exemplary embodiment of an item 20 can be a build plate, particularly a build plate which is insertable in a receiving volume of a build module 5a, the build plate being configured to support build material and/or an additively manufactured three-dimensional object 2. Another exemplary embodiment of an item 20 can be an additively manufactured object 2. Another exemplary embodiment of an item 20 can be a detecting device (not explicitly shown) configured to determine at least one chemical and/or physical parameter of at least one additive manufacturing process and/or at least one preprocessing process for an additive manufacturing process and/or at least one postprocessing process for an additive manufacturing process. Another exemplary embodiment of an item 20 can be a service and/or repair device configured to perform at least one service and/or repair functionality for at least one functional component of the at least one process station 3a-3c. Another exemplary embodiment of an item 20 can be a cleaning device configured to clean at least one conveying element and/or at least one functional component of the at least one process station 3a-3c. Other exemplary embodiments of items 20 are conceivable.

The conveying device 19 comprises at least one conveying element 22 defining the at least one conveying path 21. As is apparent from FIG. 1, a respective conveying element 22 is at least partially bound to ground 23, i.e. connected with ground 23, particularly attached to ground 23. As is apparent from FIG. 2, a respective conveying element 22 is typically a longitudinal component or a longitudinal component group extending in the additive manufacturing environment. Each portion of the at least one conveying element 22 can represent a respective first or second position P1, P2 in between which a respective item 20 can be conveyed by the conveying device 19.

As is also apparent from FIG. 2, the conveying device 19 may comprise a plurality of conveying elements 22 and conveying paths 21, respectively which may be interconnectable or interconnected with each other so as to form a network of conveying elements 22 and conveying paths 21, respectively arranged in one or more spatial directions or orientations, respectively. Hence, each conveying element 22 may be provided with a connection interface (not explicitly shown), i.e. particularly a mechanical connection interface, allowing for interconnecting the respective conveying element 22 with at least one further conveying element 22.

The conveying device 19 further comprises at least one conveying carriage 24, e.g. a conveying slide, conveying skid, conveying vehicle or conveying wagon, for instance, being connectable or connected with the conveying elements 22 so as to be moveable along the at least one conveying path 21. A respective conveying carriage 24 comprises at least one supporting interface 25 for supporting at least one item 20.

The conveying elements 22 and the conveying carriages 24 may interact with each other so as to form a "conveying couple" allowing for conveying respective items 20 between respective first and second positions P1, P2. Thereby, respective items 20 are (temporarily) supported by a respective conveying carriage 24 and the respective conveying carriage 24 (temporarily) supporting the respective item 20 is moveable along the conveying path 21, i.e. particularly moveably supported by the conveying element(s) (see FIG. 1, 2).

As is apparent from the FIG., the conveying device 19 is a separate device to the process stations 3a-3c which is not physically connectable or connected, i.e. particularly not mechanically couplable or coupled, with the process stations 3a-3c. Hence, the conveying device 19 is to be deemed as a separate device of the plant 1 whose operation is generally, independent from the operation of any process station 3a-3c of the plant 1. Providing the conveying device 19 as a respective separate device is of advantage for installation, modification and operation of the conveying device 19. Hence, the conveying device 19 may be generally, installed, modified or operated independent from any of process station 3a-3c of the plant 1.

This also applies for the case in which a respective conveying element 21 extends through at least one process station 3a-3c (as indicated in FIG. 1, 2). As is apparent from FIG. 1, 2, a respective process 3a-3c station is provided with a, particularly passage- or tunnel-like, opening 26 allowing for that at least one conveying element 22 may at least partially extend in or through a respective process station 3a-3c without actually physically contacting the process station 3a-3c. Hence, the dimensions of the opening 26 in a respective process station 3a-3c are dimensioned in such a manner that at least one conveying element 22 may least partially extend in or through the respective process station 3a-3c without physically contacting the process station 3a-3c.

A respective conveying element 22 may be provided in any dimensions, i.e. particularly, length, shape, etc. As such, a respective conveying element 22 may comprise at least one conveying element portion which extends straight and/or which comprise at least one conveying element portion which extends curved as exemplarily indicated in FIG. 2.

FIG. 2 shows further that the plant 1 may comprise at least one switch device 27 (optional) assigned to the conveying device 19. The switch device 27 is configured to switch the orientation of the at least one conveying element 22 from a first spatial orientation to at least one further spatial orientation. The or a respective switch device 27 may be built as or comprise a turning table, for instance. A respective turning table is configured to change the spatial orientation of a respective conveying element 22, particularly with a respective conveying carriage 24 supported thereon, by rotation around a, particularly vertically oriented, rotary motion axis. A respective turning table may thus, be rotated in different rotary positions, whereby the turning table typically connects to at least one conveying element 22 in every rotary position.

FIG. 2 shows further that the plant 1 may also comprise at least one branching device 28 (optional) assigned to the conveying device 19. A respective branching device 28 is configured to branch at least one conveying element 22 in at least two conveying element branches, the at least two conveying element branches each representing a separate conveying element 22.

FIG. 2 shows further that the plant 1 may also comprise at least one combining device 29 (optional). A respective combining device 29 is configured to combine at least two separate conveying elements 22 in a at least one conveying element 22, the at least one conveying element 22 representing a separate conveying element 22.

With regard to the actual conveyance of a respective conveying carriage 24 along a respective conveying path 21, the following exemplary options, which may be arbitrarily combined with each other, are given:

A respective conveying element 22 may be configured to generate a conveying force so as to move a conveying carriage 24 along the conveying path 21. Hence, the conveying element 22 may be moved itself along a respective conveying path 21. A respective conveying element 22 may be embodied as a conveying band, a conveying belt, or a conveying chain, for instance.

Additionally or alternatively, a respective conveying carriage 24 may be provided with a drive unit 30, particularly a drive motor, configured to generate a drive force so as to move the conveying carriage 30 along the conveying path 21. Hence, the conveying carriage 24 may be self-driven and thus, moves itself along a respective conveying path 21. A respective conveying element 22 may be embodied as a conveying rail, a conveying rack, or any other non-driven conveying track, for instance.

Additionally or alternatively, a moveable traction carriage 34 being provided with a drive unit 32, particularly a drive motor, configured to generate a drive force so as to move the traction carriage 34 along the conveying path 21 may be provided. A respective traction carriage 34 is self-driven and thus, moves itself along a respective conveying path 21. As is apparent from FIG. 3, a respective traction carriage 34 may be connectable or connected with a respective conveying carriage 24 so as to move a respective conveying carriage 24 along the conveying path 21. A respective traction carriage 34 may thus, comprise at least one coupling interface 35 configured to establish a (temporary) coupling of the traction carriage 34 with at least one conveying carriage 24 and/or with at least one further traction carriage 34. In other words, train-like assemblies, particularly goods train-like assemblies, of traction carriages 34 and conveying carriages 24 can be realized which can be individually configured, particularly with regard to the number and order of respective traction carriages 34 and/or conveying carriages 24 (see FIG. 3).

Figure 3:
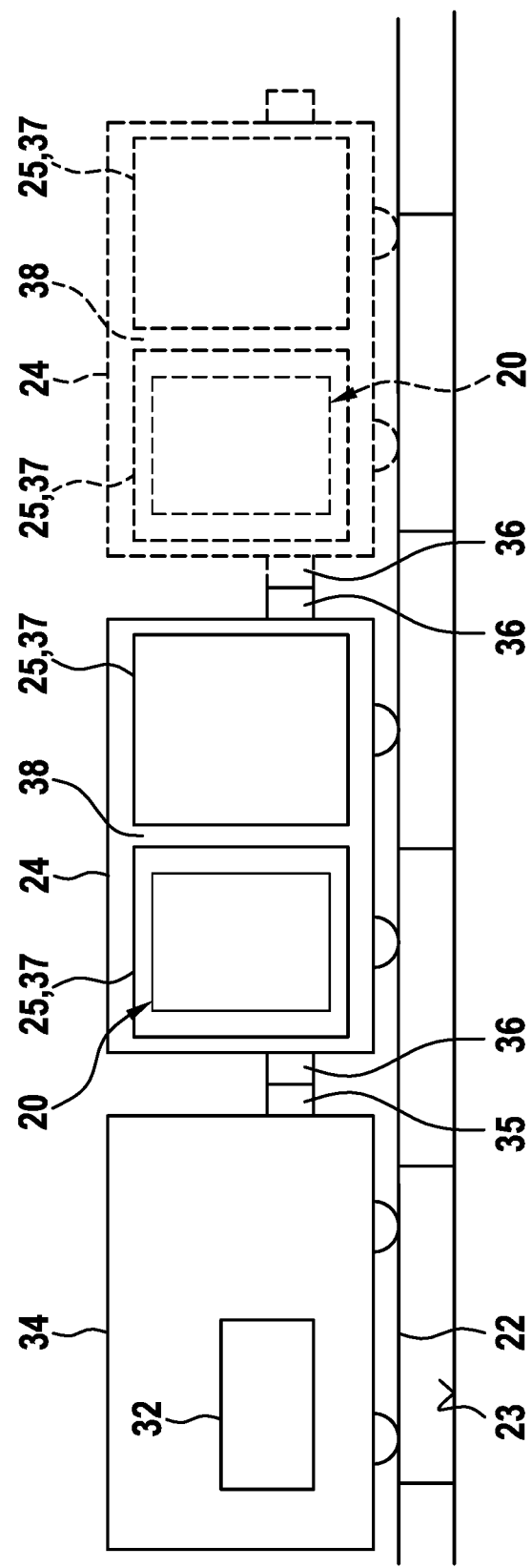

As is apparent from above, the conveying device 19 may comprise at least two conveying carriages 24 (see e.g. FIG. 3). Each conveying carriage 24 may comprise a coupling interface 36 configured to establish a coupling with at least one further conveying carriage 24, particularly so as to form a conveying carriage assembly, and/or with at least one traction carriage 34. Respective coupling interfaces 35, 36 of conveying carriages 24 and traction carriages 34 may be standardized which allows for an easy, quick and safe coupling and decoupling of conveying carriages 24 and/or traction carriages 34. Respective coupling interfaces 35, 36 may be built as mechanical coupling interfaces, such as buffer-and-chain-couplings or link- and pin-couplings, for instance. Yet, magnetic coupling interfaces or any other coupling interfaces are conceivable as well.

As indicated above, a respective conveying carriage 24 may comprise at least one supporting interface 25 configured to support at least one item 20 which is to be conveyed by the conveying carriage 24 along the conveying path 21. A respective supporting interface 25 allows for a temporary support of a respective item 20 to which is to be conveyed by the conveying carriage 24 along the at least one conveying path 21. A respective support interface 25 may be built as or provided with a support compartment 37 of a base body 38 of a conveying carriage 24. Hence, a respective conveying carriage 24 may comprise a base body 38 having at least one support compartment 37 configured to support at least one item 20 which is to be conveyed by the conveying carriage 24 along the conveying path 21. A respective support compartment 37 may form part of a support frame of the conveying carriage 24 or the base body 38, respectively. The dimensions of a respective support compartment 37 may be adapted to the dimensions of an item 20 which is to be conveyed by the conveying carriage 24 along the conveying path 21. Hence, a respective support compartment 37 may be embodied as a receptacle configured to at least partially, particularly completely, receive a respective item 20, for instance. A respective receptacle is typically defined by wall elements of a respective support compartment 37 which may at least partially cover or engage at least one surface of an item 20 which is to be supported by the support compartment 37.

As is apparent from FIG. 1, 3, a respective conveying carriage 24 may comprise at least two supporting interfaces 25 configured to support at least one item 20 which is to be conveyed by the conveying carriage 24 along the conveying path 21. Respective supporting interfaces 25 may have the same or a different configuration, whereby in the first case the supporting interfaces 25 are configured to support items 20 of same or similar dimensions and/or items 20 of same or similar functionality and in the latter case the supporting interfaces 25 are configured to support items 20 of different dimensions and/or items 20 of different functionality. Hence, a respective conveying carriage 24 may be individually provided with a specific arrangement of supporting interfaces 25 so that respective conveying carriages 24 may be specified for conveying a specific arrangement and number of items 20. Yet, it is also possible that conveying carriages 24 are standardized, i.e. provided with a standardized arrangement of supporting interfaces 25.

Figure 4:
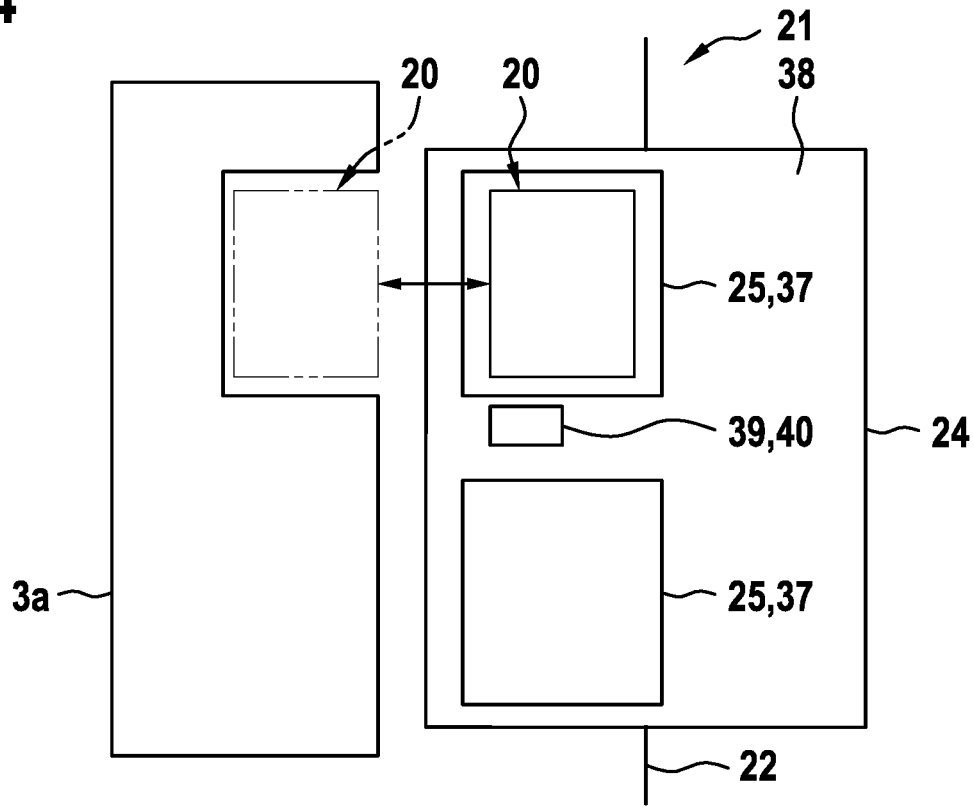

As is apparent from FIG. 4, 5, at least one transfer device 39 may be assigned to at least one conveying carriage 24, particularly to at least one supporting interface 25 of a respective conveying carriage 24. A respective transfer device 39 is configured to transfer a supported item 20 between a first position, e.g. an upper, lower, inner or outer position, and/or orientation and at least one second position, e.g. an upper, lower, inner or outer position, and/or orientation relative to at least one support interface 25 or the base body 38 of the conveying carriage 24, respectively.

As is further apparent from FIG. 4, 5, a respective first position and/or orientation may be a conveying position and/or orientation in which a respective item 20 supported by the conveying carriage 23 is positioned and/or oriented when the conveying carriage 24 (together with the supported item 20) is conveyed along a respective conveying path 21 and the second position and/or orientation may be a transfer position and/or orientation in which a respective item 20 supported by the conveying carriage 24 is positioned and/or oriented when the item 20 is to be or is transferred from the conveying carriage 24 to a process station 3a-3c. A respective transfer device 39 is thus, particularly configured to move a supported item 20 between a respective conveying position and/or orientation and a respective transfer position and/or orientation. A respective item is typically received in a respective receptacle of the conveying carriage 24 in the conveying position and/or orientation and has typically left a respective receptacle in the transfer position and/or orientation (see dotted lines in FIG. 4, 5).

As is apparent from FIG. 4, a respective transfer device 39 may be built as or comprise a pushing and/or pulling device 40 configured to push or pull a supported item 20 in a lateral direction between a first position and/or orientation and a second position and/or orientation relative to the support interface 25 or the base body 38 of the conveying carriage 24, respectively.

Figure 5:
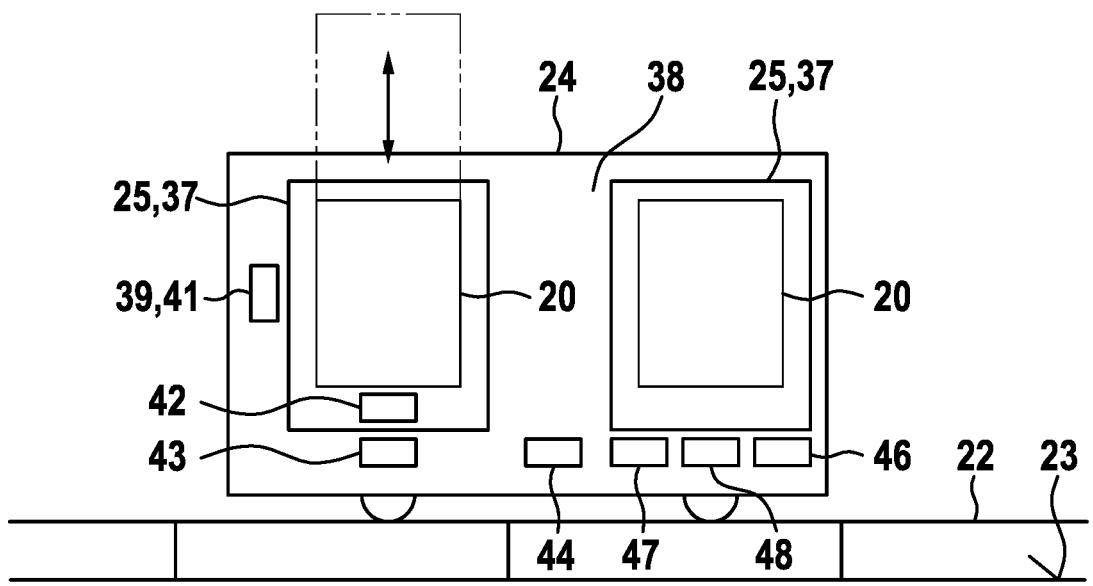

As is apparent from FIG. 5, a respective transfer device 39 may also be built as or comprise a lifting device 41 configured to lift a supported item 20 in a vertical direction between a first position and/or orientation and a second position and/or orientation relative to the support interface 25 or the base body 38 of the conveying carriage 24, respectively.

FIG. 5 also shows that an optional locking device 42 may be assigned to a conveying carriage 24, particularly to a respective supporting interface 25 of the conveying carriage 24. A respective locking device 42 is configured to lock an item 20 supported by the supporting interface 25 in a defined position and/or orientation, particularly in a respective conveying position, relative to the support interface 25 or the base body 38 of the conveying carriage 24, respectively.

A respective locking device 42 may comprise at least one locking element (not explicitly shown) configured to interact, particularly configured to magnetically, mechanically, pneumatically, etc. interact, with an item 20 supported by the supporting interface 25 of a conveying carriage 24. In either case, a respective locking element may generate a locking force stably locking an item 20 supported by the supporting interface 25 of a conveying carriage 24 in place.

FIG. 5 further shows that a respective conveying carriage 24 may comprise a determination device 43 (optional), particularly assigned to the supporting interface 25. A respective determination device 43 may be configured to determine at least one chemical and/or physical parameter of an item 20 supported by the supporting interface 25 and/or configured to determine at least one chemical and/or physical parameter of a substance, e.g. build material 4, and/or an object, e.g. an additively manufactured three-dimensional object 2, contained within the item 20 supported by the supporting interface 25. A respective determination device 43 may be further configured to generate an information indicating the determined at least one chemical and/or physical parameter. A respective determination device 43 may comprise at least one detection element (not explicitly shown), e.g. a sensor element, configured to determine at least one chemical and/or physical parameter of an item 20 supported by the supporting interface 25 and/or configured to determine at least one chemical and/or physical parameter of a substance and/or an object contained within the item 20 supported by the supporting interface 25. A respective detection element may be built as or comprise a temperature sensor, gas sensor, pressure sensor, force sensor, gravity sensor, etc.

FIG. 5 further shows that a respective conveying carriage 24 may comprise a (further) determination device 44 configured to determine at least one actual and/or future operational parameter of the conveying carriage 24, particularly a conveying parameter referring to a conveying motion of the conveying carriage 24 between at least two positions P1, P2, and to generate an operating information indicating the determined at least one operating parameter. A respective operating parameter may refer to any actual or future status of an operating parameter of the conveying carriage 24 and/or a sub-unit of the conveying carriage 24. A respective conveying parameter may refer to (positive or negative) acceleration, speed, conveying direction, conveying duration, etc. of the conveying carriage 24.

A respective determination device 44 may additionally or alternatively be configured to determine at least one actual and/or future position parameter of a respective conveying carriage 24 and to generate a position information indicating the determined position parameter. A respective position parameter may refer to a local and/or global position of the respective conveying carriage 24. A respective position parameter may thus, refer to local or global position data, e.g. GPS-data, of the respective conveying carriage 24.

FIG. 2 also shows that a respective conveying carriage 24 may be provided with a hardware- and/or software embodied control unit 45 being configured to control at least one conveying parameter of the at least one conveying carriage 24, particularly on basis of a determined operating information, particularly conveying information, and/or position information. The control unit 45 may comprise at least one control sub-unit 46 provided with a respective conveying carriage 24. Hence, any conveying motion of a respective conveying carriage 24 within the plant 1 can be performed on basis of control data, particularly derived from determined operating information, particularly conveying information, and/or position information, which allows for an automated and highly efficient motion of respective conveying carriages 24 within the plant 1. Considering information such as operating information, particularly conveying information, and/or position information, for instance may allow for determining highly efficient conveying paths 21, particularly with reduced conveying duration, of items 20 between a respective first and second position P1, P2. Merely as an example, conveying paths 21 with a high number of conveying carriages 24 can be avoided for a specific conveying carriage 24 such that the specific conveying carriage 24 may use a different conveying path 21 for conveying an item 20 between a respective first and second position P1, P2.

As is further apparent from FIG. 5, a conveying carriage 24 may comprise a data storage device 47, e.g. a volatile or non-volatile data memory, configured to store at least one information of the conveying carriage 24 and/or at least one information of at least one item 20 conveyed by the conveying carriage 20 and/or at least one information of a substance and/or on object within an item 20 conveyed by the conveying carriage 24 and/or at least one information of the conveying path 21 the conveying carriage 24 is intended to be conveyed along.

As is further apparent from FIG. 5, a respective conveying carriage 24 may comprise a communication device 48 assigned to the data storage device 47. The communication device 48 may be configured to transmit information from the data storage device 47 to at least one communication partner, e.g. to a different conveying carriage 24, traction device 34, item 20, beacon or any other Bluetooth low energy (BLE) device, or superordinate control unit 45 of the plant 1, and/or to receive information to be stored in the data storage device 47 from at least one communication partner, e.g. from a different conveying carriage 24, traction device 34, item 20, beacon or any other Bluetooth low energy (BLE) device, or superordinate control unit 45 of the plant 1. The communication device 48 may comprise at least one communication element (not explicitly shown) allowing for short- and/or long-range communication. Merely as an example, a respective communication element may be built as or comprise a radio frequency identification (RFID) device, particularly a RFID transceiver device, or a Bluetooth low energy (BLE) device.

Referring again to FIG. 2, the plant 1 typically defines an additive manufacturing environment. The additive manufacturing environment may comprise one or more buildings (see dotted lines), e.g. a fabric hall, or one or more parts of a building (see dotted lines), e.g. rooms. The plant 1 may thus, comprise at least two buildings, whereby the conveying device 19 may be configured to convey at least one item 20 between a first position P1 in a first building and a second position P2 in a second building. At least one building of the plant 1 may comprise at least two adjacent or non-adjacent rooms, whereby the conveying device 19 may be configured to convey at least one item 20 between a first position P1 in a first room and a second position P2 in a second room. Of course, the conveying device 19 may also be configured to convey at least one item 20 within one (single) room of a building.

Even though not shown in the FIG., a respective conveying element 22 may be at least partially housed by a housing structure. The housing structure may represent a tunnel through which the respective conveying element 22 extends. A respective housing structure increases the safety of the conveying device 19 and the plant 1, respectively since personal cannot get in contact with the conveying device 19.

The plant 1 allows for implementing a method for conveying at least one item 20 between at least two positions P1, P2, particularly along a conveying path 21, of a plant 1 for additively manufacturing at least one three-dimensional object 2, whereby a conveying device 19 as described herein is used for conveying the at least one item 20 between the at least two positions P1, P2 of the plant 1.

Single, a plurality, or all features mentioned in context with a specific embodiment may also apply to other embodiments. Hence, a single, a plurality, or all features mentioned in context with a specific embodiment may be combined with at least one feature of another specific embodiment.

The invention claimed is:

1. A plant for additively manufacturing at least one three-dimensional object, the plant comprising:
   at least one process station configured to perform at least one additive manufacturing process, and/or at least one preprocessing process for an additive manufacturing process, and/or at least one post processing process for an additive manufacturing process;
   at least one conveying device configured to convey at least one item comprising a powder module between at least two positions of the plant, the conveying device comprising:
      at least one conveying element at least partially bound to a ground; and,
      at least two conveying carriages, wherein at least one conveying carriage is connectable or connected with the conveying element so as to be moveable between the at least two positions of the plant, wherein the at least one conveying carriage comprises at least one supporting interface for supporting the at least one item, and wherein at least two conveying carriages each comprise a connecting interface, wherein a first connecting interface of a first conveying carriage is configured to establish a direct coupling connection with a second connecting interface of a second conveying carriage when the first conveying carriage is adjacent the second conveying carriage.

2. The plant of claim 1, wherein the conveying device is a separate device to the at least one process station.

3. The plant of claim 1, wherein the at least one conveying element comprises at least one conveying element portion that extends straight.

4. The plant of claim 1, wherein the at least one conveying element comprises at least one conveying element portion that extends curved.

5. The plant of claim 1, wherein the at least one conveying element is configured to generate a conveying force configured to move the at least one conveying carriage along the at least one conveying element.

6. The plant of claim 1, wherein the at least one conveying carriage comprises a drive unit configured to generate a drive force to move the at least one conveying carriage along the at least one conveying element.

7. The plant of claim 1 further comprising at least one traction carriage being connectable or connected with the at least one conveying element so as to be moveable between the at least two positions of the plant, wherein the traction carriage comprises a drive unit configured to generate a drive force to move the traction carriage along the at least two positions of the plant;
   wherein, the at least one traction carriage comprises at least one connection interface configured to establish a connection of the traction carriage with at least one additional traction carriage and/or with the at least one conveying carriage.

8. The plant of claim 1 further comprising a transfer device configured to transfer a supported item between a first position and/or orientation and a second position and/or orientation relative to a base body of the conveying device.

9. The plant of claim 1 wherein the at least one conveying carriage comprises a determination device assigned to the at least one supporting interface, wherein the determination device is configured to determine at least one chemical and/or physical parameter of a substance of the at least one item supported by the at least one supporting interface.

10. The plant of claim 1, wherein the at least one conveying carriage comprises at least one determination device configured to determine at least one actual and/or future operating parameter.

11. The plant of claim 1 further comprising a control unit configured to control at least one conveying parameter of the at least one conveying carriage.

12. The plant of claim 1, wherein the at least one conveying carriage comprises a data storage device configured to store at least one information of the at least one conveying carriage and/or of the at least one item conveyed by the at least one conveying carriage.

13. The plant of claim 12 further comprising a communication device configured to transmit information from the data storage device to at least one communication partner and/or receive information to be stored in the data storage device from the at least one communication partner.

14. The plant of claim 1, wherein the at least one item further comprises a build plate, an additively manufactured three-dimensional object, a determination device, a service and/or repair device, or a cleaning device.

15. A conveying device for a plant for additively manufacturing three-dimensional objects, the conveying device configured to convey at least one item comprising a powder module between at least two positions of the plant, the conveying device comprising:
- at least one conveying element at least partially bound to a ground; and,
- at least two conveying carriages, wherein at least one conveying carriage is connectable or connected with the conveying element so as to be moveable between the at least two positions of the plant, wherein the at least one conveying carriage comprises at least one supporting interface for supporting the at least one item, and wherein at least two conveying carriages each comprise a connecting interface, wherein a first connecting interface of a first conveying carriage is configured to establish a direct coupling connection with a second connecting interface of a second conveying carriage when the first conveying carriage is adjacent the second conveying carriage.

* * * * *